US012621867B2

(12) United States Patent
Li et al.

(10) Patent No.: US 12,621,867 B2
(45) Date of Patent: May 5, 2026

(54) RO TIME-DOMAIN RESOURCE CONFIGURATION METHOD AND APPARATUS AND ELECTRONIC DEVICE

(71) Applicant: VIVO MOBILE COMMUNICATION CO., LTD., Dongguan (CN)

(72) Inventors: Ping Li, Dongguan (CN); Qi Hong, Dongguan (CN); Gen Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 369 days.

(21) Appl. No.: 18/206,601

(22) Filed: Jun. 6, 2023

(65) Prior Publication Data

US 2023/0319897 A1 Oct. 5, 2023

Related U.S. Application Data

(63) Continuation of application No. PCT/CN2021/136021, filed on Dec. 7, 2021.

(30) Foreign Application Priority Data

Dec. 7, 2020 (CN) .......................... 202011437862.2

(51) Int. Cl.
*H04W 74/0833* (2024.01)
*H04W 74/00* (2009.01)

(52) U.S. Cl.
CPC ..... *H04W 74/0833* (2013.01); *H04W 74/004* (2013.01)

(58) Field of Classification Search
CPC ........... H04W 74/004; H04W 74/0833; H04W 72/0446; H04W 72/53
See application file for complete search history.

(56) References Cited

U.S. PATENT DOCUMENTS

2019/0306832 A1* 10/2019 Si .......................... H04W 76/15
2020/0229244 A1 7/2020 Yan et al.
(Continued)

FOREIGN PATENT DOCUMENTS

CN 109600859 A 4/2019
CN 110419259 A 11/2019
(Continued)

OTHER PUBLICATIONS

Extended European Search Report issued in related European Application No. 21902586.3, mailed May 14, 2024, 12 pages.
(Continued)

*Primary Examiner* — Abdullahi Ahmed
(74) *Attorney, Agent, or Firm* — IPX PLLC

(57) ABSTRACT

A Random access Occasion (RO) time-domain resource configuration method and apparatus and an electronic device are provided. The RO time-domain resource configuration method is performed by a terminal, and includes: obtaining a subcarrier spacing of a reference time unit determined according to a first rule; and determining, based on a first information set and the subcarrier spacing of the reference time unit, RO time-domain resource configuration information that is in each subframe and that is used for transmitting a random access preamble. Parameters of the first information set are obtained in at least one of the following manners: parameters configured by second configuration signaling; obtained by extending the parameters configured by the second configuration signaling; parameters predefined by a protocol; or obtained by extending the parameters predefined by the protocol.

20 Claims, 10 Drawing Sheets

12

Network-side device

11

11

Terminal

Terminal

(56) References Cited

U.S. PATENT DOCUMENTS

| | | | | |
|---|---|---|---|---|
| 2021/0410138 A1* | 12/2021 | Park | | H04L 5/0053 |
| 2022/0095381 A1* | 3/2022 | Xiong | | H04W 74/0833 |
| 2022/0225429 A1* | 7/2022 | Xiong | | H04L 5/0053 |
| 2022/0408492 A1* | 12/2022 | Shin | | H04L 27/26 |
| 2023/0156812 A1* | 5/2023 | Yang | | H04L 5/00 |
| | | | | 370/329 |
| 2023/0171813 A1* | 6/2023 | Zheng | | H04W 74/0841 |
| | | | | 370/329 |
| 2023/0292371 A1* | 9/2023 | Rune | | H04W 74/0833 |
| 2024/0032103 A1* | 1/2024 | Rastegardoost | | H04W 74/0833 |
| 2024/0349346 A1* | 10/2024 | Khan Beigi | | H04W 74/0833 |

FOREIGN PATENT DOCUMENTS

| | | | |
|---|---|---|---|
| CN | 110831237 A | 2/2020 | |
| CN | 110972279 A | 4/2020 | |
| CN | 111345089 A | 6/2020 | |
| EP | 4152853 A1 | 3/2023 | |
| EP | 4258585 A1 | 10/2023 | |
| WO | 2020222481 A1 | 11/2020 | |

OTHER PUBLICATIONS

Moderator (Intel Corporation): "[103-e-NR-52-71-Waveform-Changes] Discussions Summary #3", 3GPP Draft; R1-2009667, Nov. 2020, 128 pages.

Zte et al: "Summary of PRACH Remaining details on PRACH formats", 3GPP Draft; R1-1718932, 28 pages.

First Office Action issued in related European Application No. 202011437862.2, mailed Jan. 3, 2025, 8 pages.

International Search Report issued in corresponding International Application No. PCT/CN2021/136021, mailed Feb. 22, 2022, 4 pages.

Vivo, "Discussions on Initial Access Aspects for NR Operation from 52.6GHz to 71GHz", 3GPP TSG RAN WG1 #104-e R1-2100429, Jan. 2021, 10 pages.

CATT, "System Analysis of NR Operation in 52.6GHz to 71 GHz", 3GPP TSG RAN WG1 #103-e R1-2007847, Nov. 2020, 13 pages.

* cited by examiner

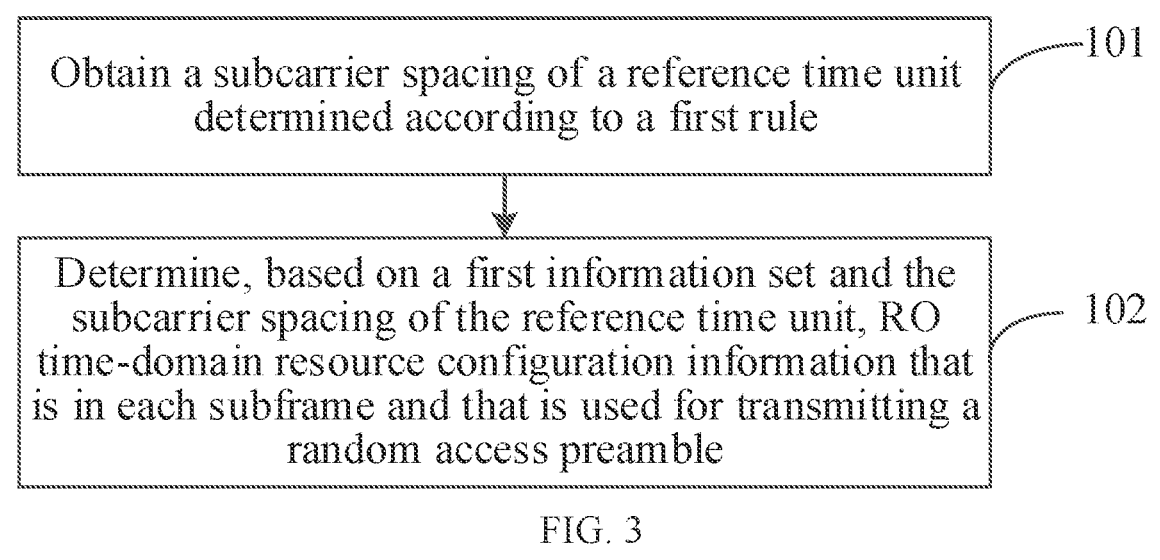

Obtain a subcarrier spacing of a reference time unit determined according to a first rule ~101

Determine, based on a first information set and the subcarrier spacing of the reference time unit, RO time-domain resource configuration information that is in each subframe and that is used for transmitting a random access preamble ~ 102

FIG. 3

RO TIME-DOMAIN RESOURCE CONFIGURATION METHOD AND APPARATUS AND ELECTRONIC DEVICE

CROSS-REFERENCE TO RELATED APPLICATIONS

This application is a continuation of International Application No. PCT/CN2021/136021, filed on Dec. 7, 2021, which claims the priority of Chinese Patent Application No. 202011437862.2 filed on Dec. 7, 2020. The entire contents of each of the above-referenced applications are expressly incorporated herein by reference.

TECHNICAL FIELD

This application relates to the field of communications technologies, and in particular to an RO time-domain resource configuration method and apparatus and an electronic device.

BACKGROUND

A large Physical Random Access Channel (PRACH) Subcarrier Spacing (SCS) is introduced into the related art. According to a current protocol configuration, a subcarrier spacing of a reference slot of a Frequency Range (FR) 1 is 15 kHz, and a supported PRACH subcarrier spacing is {15, 30} kHz. A subcarrier spacing of a reference slot of an FR 2 is 60 kHz, and a supported PRACH subcarrier spacing is {60, 120} kHz. In a case that an SCS is greater than 120 kHz, even if a 60-kHz subcarrier spacing of a reference slot of the FR 2 is used, the number of PRACH slots within a reference slot exceeds 2. However, in an existing configuration table, the number of PRACH slots within a 60-kHz slot can only be 1 or 2, and cannot be used for a larger subcarrier spacing. Therefore, to follow Random access Occasion (RO) time-domain resource configuration of the FR 2, a reference slot and a parameter set of corresponding RO time-domain configuration need to be redesigned to support a larger PRACH subcarrier spacing.

SUMMARY

Embodiments of this application provide an RO time-domain resource configuration method and apparatus and an electronic device, to support a larger PRACH subcarrier spacing.

According to a first aspect, an embodiment of this application provides an RO time-domain resource configuration method, performed by a terminal, and including:

obtaining a subcarrier spacing of a reference time unit determined according to a first rule; and determining, based on a first information set and the subcarrier spacing of the reference time unit, RO time-domain resource configuration information that is in each subframe and that is used for transmitting a random access preamble, where parameters of the first information set are obtained in at least one of the following manners:

parameters configured by second configuration signaling;

obtained by extending the parameters configured by the second configuration signaling;

parameters predefined by a protocol; and obtained by extending the parameters predefined by the protocol.

According to a second aspect, an embodiment of this application provides an RO time-domain resource configuration apparatus, including:

an obtaining module, configured to obtain a subcarrier spacing of a reference time unit determined according to a first rule; and a processing module, configured to determine, based on a first information set and the subcarrier spacing of the reference time unit, RO time-domain resource configuration information that is in each subframe and that is used for transmitting a random access preamble, where parameters of the first information set are obtained in at least one of the following manners:

parameters configured by second configuration signaling;

obtained by extending the parameters configured by the second configuration signaling;

parameters predefined by a protocol; and obtained by extending the parameters predefined by the protocol.

According to a third aspect, an embodiment of this application further provides an electronic device, including a processor, a memory, and a program or instructions stored in the memory and executable on the processor, where the program or instructions, when being executed by the processor, implement the steps of the foregoing method.

According to a fourth aspect, an embodiment of this application provides a readable storage medium is this embodiment of this application, the provided, the readable storage medium storing a program or an instruction, where the program or instruction, when being executed by a processor, implements the steps of the foregoing method.

According to a fifth aspect, an embodiment of this application provides a chip. The chip includes a processor and a communication interface. The communication interface is coupled to the processor. The processor is configured to execute a program or instructions, to implement the method in the first aspect.

According to a sixth aspect, a computer program product is provided, where the computer program product is stored in a non-volatile storage medium, where the computer program product is executed by at least one processor to implement the steps of the method in the first aspect.

In embodiments of this application, a subcarrier spacing of a reference time unit determined according to a first rule is obtained, and then RO time-domain resource configuration information that is in each subframe and that is used for transmitting a random access preamble is determined based on a first information set and the subcarrier spacing of the reference time unit. In this way, existing RO time-domain resource configuration may be followed, so that a larger PRACH subcarrier spacing is supported.

BRIEF DESCRIPTION OF THE DRAWINGS

To describe the technical solutions in the embodiments of this application more clearly, the accompanying drawings required in the description of the embodiments of this application are briefly described below. Apparently, the accompanying drawings in the following description show merely some embodiments of this application, and a person of ordinary skill in the art may still derive other drawings from these accompanying drawings without creative efforts.

FIG. 3 is a schematic flowchart of an RO time-domain resource configuration method according to an embodiment of this application;

DETAILED DESCRIPTION

Figure 1:
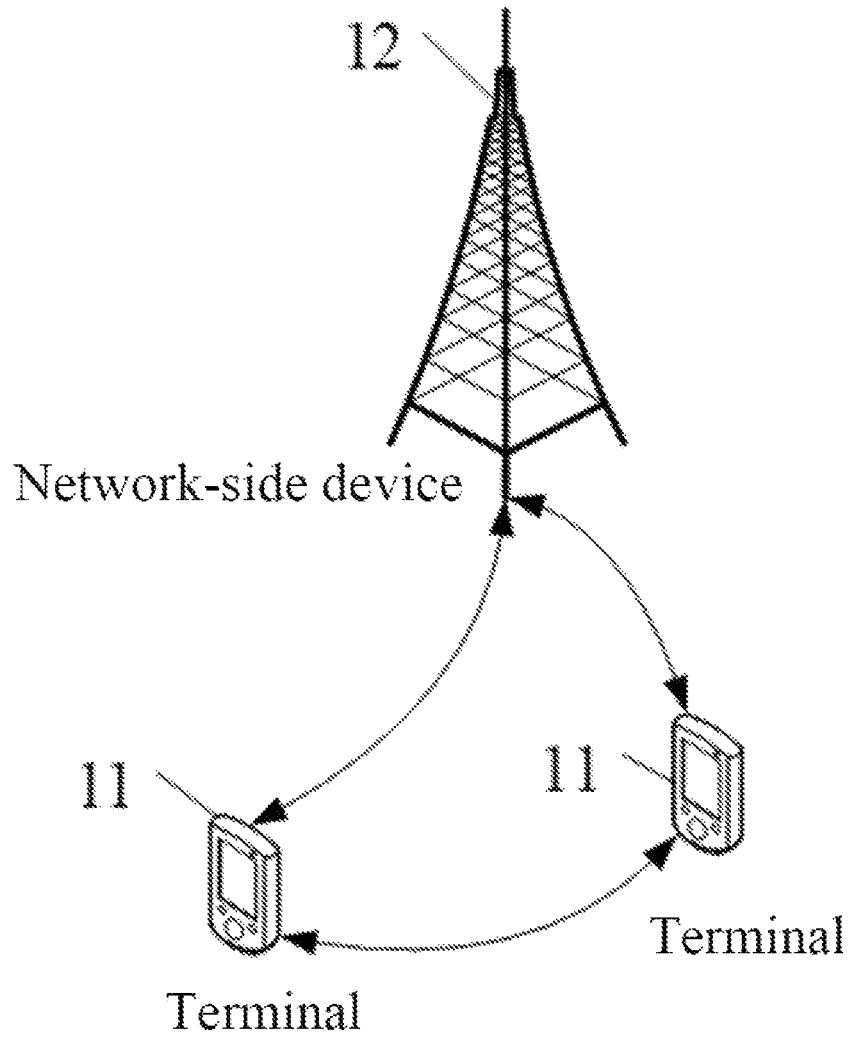
FIG. 1 is a schematic diagram of a wireless communication system according to an embodiment of this application.
Figure 2:
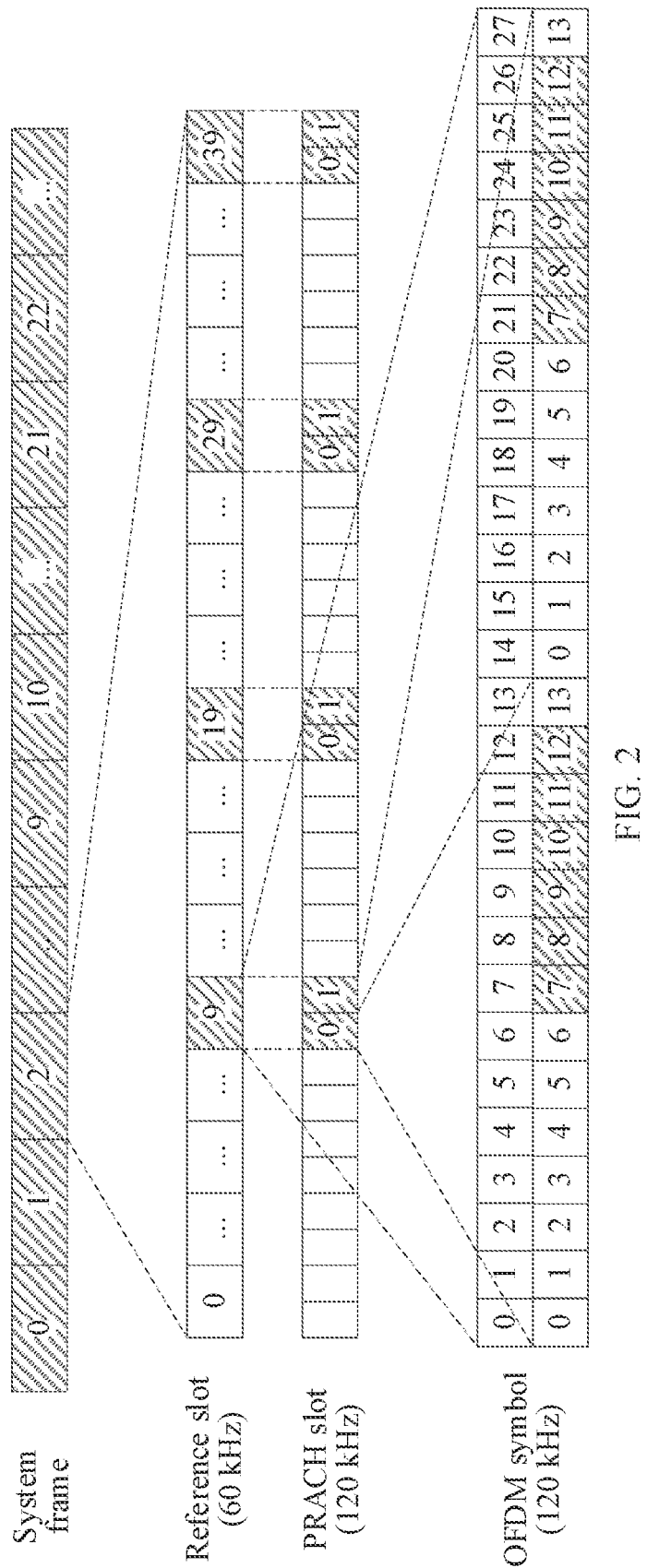
FIG. 2 is a schematic diagram of RO time-domain resource configuration with a PRACH SCS of 120 kHz according to an embodiment of this application.

The following clearly describes the technical solutions in embodiments of this application with reference to the accompanying drawings in embodiments of this application. Apparently, the described embodiments are some of embodiments of this application rather than all of the embodiments. All other embodiments obtained by a person of ordinary skill in the art based on embodiments of this application shall fall within the protection scope of this application.

The specification and claims of this application, and terms "first" and "second" are used to distinguish similar objects, but are unnecessarily used to describe a specific sequence or order. It may be understood that the data used in such a way is interchangeable in proper circumstances, so that the embodiments of the present application can be implemented in other sequences than the sequence illustrated or described herein. In addition, "and/or" in the specification and claims indicates at least one of the connected objects, and the character "/", generally indicates an "or" relationship between the associated objects.

The technology described herein is not limited to a Long Term Evolution (LTE)/LTE-Advanced (LTE-A) system, and may be used in various wireless communication systems such as Code Division Multiple Access (CDMA), Time Division Multiple Access (TDMA), Frequency Division Multiple Access (FDMA), Orthogonal Frequency Division Multiple Access (OFDMA), and Single-Carrier Frequency-Division Multiple Access (SC-FDMA), and another system. The terms "system" and "network" are often used interchangeably. The CDMA system may implement radio technologies such as CDMA2000 and Universal Terrestrial Radio Access (UTRA). The UTRA includes a Wideband CDMA (WCDMA) and other CDMA variants. The TDMA system may implement radio technologies such as Global System for Mobile Communications (GSMs). The OFDMA system may implement radio technologies such as UltraMobile Broadband (UMB), Evolved-UTRA (E-UTRA), IEEE 802.11 (Wi-Fi), IEEE 802.16 (WiMAX), IEEE 802.20, and Flash-OFDM. UTRA and E-UTRA are parts of Universal Mobile Telecommunications System (UMTS). LTE and more advanced LTE (for example, LTE-A) use new UMTS releases of E-UTRA. UTRA, E-UTRA, UMTS, LTE, LTE-A, and GSM are described in the documents from the organization named "Third Generation Partnership Project" (3GPP). CDMA2000 and UMB are described in the documents from the organization named "Third Generation Partnership Project 2" (3GPP2). The technology described herein may be used for both the systems and radio technologies mentioned above as well as for other systems and radio technologies. The following descriptions describe NR systems for exemplary purposes and use the term NR for most of the following descriptions. However, these technologies may also be applied to applications other than NR system applications.

Examples are provided in the following description, but are not used to limit the scope, applicability or configuration described in the claims. Changes may be made to the functions and arrangement of the described elements without departing from the spirit and scope of the present disclosure. Various procedures or components may be appropriately omitted, replaced, or added in various examples. For example, the described methods may be performed in a different order than described, and various steps may be added, omitted, or combined. In addition, features described with reference to some examples may be combined in other examples.

FIG. 1 is a schematic diagram of a wireless communication system to which an embodiment of this application is applicable. The wireless communication system includes a terminal 11 and a network-side device 12. The terminal 11 may also be referred to as a terminal device or a User Equipment (UE). The terminal 11 may be a mobile phone, a tablet personal computer, a laptop computer, a Personal Digital Assistant, PDA), a Mobile Internet Device (MID), a wearable device or an in-vehicle device, among other terminal side devices. It should be noted that the specific type of the terminal 11 is not limited in embodiments of this application. The network-side device 12 may be a base station or a core network. The foregoing base station may be a base station of 5G and later releases (for example, a gNB, a 5G NR NB), or a base station (for example, an evolved NodeB (eNB), a WLAN access point, or another access point) in other communication systems, or a location server (for example, an Evolved Serving Mobile Location Center (E-SMLC) or a Location Manager Function (LMF)). The base station may be referred to as a nodeB, an evolved nodeB, an access point, a Base Transceiver Station (BTS), a radio base station, a radio transceiver, a Basic Service Set (BSS), an Extended Service Set (ESS), a nodeB, an eNB, a home nodeB, a home evolved nodeB, a WLAN access point, a Wi-Fi node, or some other appropriate term in the field, provided that the same technical effect is achieved. The base station is not limited to a specific technical vocabulary. It needs to be noted that a base station in an NR system is only used as an example in embodiments of this application. However, the specific type of the base station and the specific communication system are not limited in embodiments of this application.

In an existing communication system, an PRACH is used for transmitting a random access preamble. Only one preamble can be transmitted at each RO. However, a plurality of UEs may use a same RO to transmit different preambles.

A starting position of the PRACH in frequency domain is specified by msg1-FrequencyStart or msgA-RO-FrequencyStart. In initial access duration, this field indicates a frequency offset (in Resource Blocks (RB)) between the lowest PRACH resource in frequency domain and a Physical Resource Block (PRB) 0 of an initial uplink Bandwidth Part (BWP). In another case, this field indicates a frequency offset (in RBs) between the lowest PRACH resource in frequency domain and a PRB 0 of a corresponding activated uplink BWP. msg1-FDM or msgA-RO-FDM indicates the number of PRACH resources (having the same position in time domain) included in frequency domain. Each PRACH resource in frequency domain is indicated by an index $n_{RA} \in \{0, 1, \ldots, M-1\}$. M is equal to the value of msg1-FDM or msgA-RO-FDM. In initial access duration, the index is numbered in ascending order of frequency in the initial uplink BWP starting from the lowest frequency. In another case, the index is numbered in ascending order of frequency in the activated uplink BWP starting from the lowest frequency.

Preambles of one cell are transmitted on a group of PRACH slots. One PRACH slot may include a plurality of ROs (e.g., PRACH occasion) in time domain. Each RO is used for transmitting a preamble in a specific format. A time-domain resource that can be transmitted by a random access preamble is determined by a prach-Configuration field. UE uses prach-ConfigurationIndex to search Table 1 (an FR 1 and using a paired spectrum/Supplementary Uplink (SUL)), Table 2 (an FR 1 and using an unpaired spectrum), or Table 3 (an FR 2 and using an unpaired spectrum) of a corresponding configuration to obtain a used preamble format and an available PRACH time-domain resource of a corresponding cell.

TABLE 1

Random access configurations for an FR 1 and a paired spectrum/supplementary uplink

| PRACH configuration index | Random access preamble format | $n_{SFN} \bmod x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 1 | 0 | — | — | 0 |
| 1 | 0 | 16 | 1 | 4 | 0 | — | — | 0 |
| 2 | 0 | 16 | 1 | 7 | 0 | — | — | 0 |
| 3 | 0 | 16 | 1 | 9 | 0 | — | — | 0 |
| 4 | 0 | 8 | 1 | 1 | 0 | — | — | 0 |
| ... | ... | ... | ... | ... | ... | ... | ... | ... |

TABLE 2

Random access configurations for an FR 1 and an unpaired spectrum

| PRACH configuration index | Preamble format | $n_{SFN} \bmod x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| ... | ... | ... | ... | ... | ... | ... | ... | ... |

TABLE 3

| PRACH Config. Index | Preamble format | $n_{SFN}$ mod x = y | | Slot number (Slot number) | Starting symbol | Number of PRACH slots within a 60-kHz slot | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | A1 | 16 | 1 | 4, 9, 14, 19, 24, 29, 34, 39 | 0 | 2 | 6 | 2 |
| 1 | A1 | 16 | 1 | 3, 7, 11, 15, 19, 23, 27, 31, 35, 39 | 0 | 1 | 6 | 2 |
| 2 | A1 | 8 | 1, 2 | 9, 19, 29, 39 | 0 | 2 | 6 | 2 |
| 3 | A1 | 8 | 1 | 4, 9, 14, 19, 24, 29, 34, 39 | 0 | 2 | 6 | 2 |
| 4 | A1 | 8 | 1 | 3, 7, 11, 15, 19, 23, 27, 31, 35, 39 | 0 | 1 | 6 | 2 |
| . . . | . . . | . . . | . . . | . . . | . . . | . . . | . . . | . . . |

For the FR 1, a slot in the FR 1 uses a 15-kHz subcarrier spacing as a reference. For the FR 2, a slot in the FR 2 uses a 60-kHz subcarrier spacing as a reference.

Meanings of the parameters in the foregoing three tables are as follows:

PRACH Configuration Index refers to an index value of RO configuration, and is configured by Radio Resource Control (RRC) signaling.

Preamble format refers to a used Preamble format.

$n_{SFN}$ mod x=y refers to a radio frame position of an RO. For example, $n_{SFN}$ mod 1=0 represents that a preamble may be transmitted in each radio frame.

Subframe/Slot number refers to a sequence number of a subframe or a slot in which an RO is located within a radio frame of which transmission is allowed.

Starting symbol refers to a sequence number of a starting symbol number of a first RO in time domain in each subframe/60-kHz slot including ROs.

Number of PRACH slots within a subframe/60-kHz slot refers to the number of PRACH slots included within a subframe/60-kHz slot.

$$N_t^{RA,slot}$$

refers to the number of ROs included within a PRACH slot, that is, the number of time domain transmission opportunities of a preamble.

$$N_{dur}^{RA}$$

refers to the number of OFDM symbols occupied by an RO.

It may be calculated, based on the foregoing parameter set, that a position of a starting OFDM symbol of each RO included within a PRACH slot within a reference slot is:

$$l = l_0 + n_t^{RA} N_{dur}^{RA} + 14 n_{slot}^{RA},$$

where $l_0$ is a starting symbol;

$$n_t^{RA}$$

is an $$n_t^{RAth}$$

PRACH occasion within a PRACH slot, and has a sequence number being 0 to $$N_t^{RA,slot} - 1$$

sequentially;

$$N_{dur}^{RA}$$

is the number of OFDM symbols occupied by a PRACH occasion in time domain; and in a case that $\Delta f_{RA} \in \{1.25,5,15,60\}$ kHz, a slot sequence number of a PRACH slot within a reference slot is $$n_{slot}^{RA} = 0;$$

in a case that $\Delta f_{RA} \in \{30,120\}$ kHz and the number of PRACH slots within a subframe is equal to 1 or the number of PRACH slots within 60-kHz slot is equal to 1, a slot sequence number of a PRACH slot within a reference slot is $$n_{slot}^{RA} = 1;$$

or in other cases a slot sequence number of a PRACH slot within a reference slot is $$n_{slot}^{RA} \in \{0, 1\}.$$

For example, it is assumed that an FR 2 and an unpaired spectrum/SUL are used and a subcarrier spacing of a preamble is 120 kHz. In a case that an indicated PRACH Configuration Index is equal to 74, it is obtained through table lookup that in this configuration, UE can transmit a preamble in a format A3 in only slots (9, 19, 29, 39) of system frames that satisfy $n_{SFN}\%1=0$ (that is, all system frames) (for the FR 2, slots are numbered with a subcarrier spacing of 60 kHz as a reference). One slot includes two consecutive PRACH slots (the value of a corresponding Number of PRACH slots within a 60-kHz slot is 2). One PRACH slot includes $$N_t^{RA,slot} = 1$$

ROs in time domain. Each RO occupies $$N_{dur}^{RA} = 6$$

OFDM symbols, and a PRACH is transmitted starting from an eighth OFDM symbol (the value of a corresponding Starting symbol is 7) of each PRACH slot.

It may be calculated, based on the foregoing parameter set, that a position of a starting OFDM symbol of each RO included within a PRACH slot within a reference slot is:

$$1 = 1_0 + n_t^{RA} N_{dur}^{RA} + 14 n_{slot}^{RA} = 7 + 0 \times 6 + 14 \times \{0, 1\} = [7, 21].$$

A large PRACH SCS is introduced into the related art. According to a current protocol configuration, a subcarrier spacing of a reference slot of an FR 1 is 15 kHz, and a supported PRACH subcarrier spacing is (15, 30) kHz. A subcarrier spacing of a reference slot of an FR 2 is 60 kHz, and a supported PRACH subcarrier spacing is {60, 120} kHz. In a case that an SCS is greater than 120 kHz, even if a 60-kHz subcarrier spacing of a reference slot of the FR 2 is used, the number of PRACH slots within a reference slot exceeds 2. However, in an existing configuration table, the number of PRACH slots within a 60-kHz slot can only be 1 or 2, and cannot be used for a larger subcarrier spacing. Therefore, to follow RO time-domain resource configuration of the FR 2, a reference slot and a parameter set of corresponding RO time-domain configuration need to be redesigned to support a larger PRACH subcarrier spacing.

An embodiment of this application provides a random access occasion RO time-domain resource configuration method, performed by a terminal. As shown in FIG. 3, the method includes the following steps.

Step 101: Obtain a subcarrier spacing of a reference time unit determined according to a first rule.

Step 102: Determine, based on a first information set and the subcarrier spacing of the reference time unit, RO time-domain resource configuration information that is in each subframe and that is used for transmitting a random access preamble.

Parameters of the first information set are obtained in at least one of the following manners:

parameters configured by second configuration signaling;

obtained by extending the parameters configured by the second configuration signaling;

parameters predefined by a protocol; and

TABLE 4

Random access configurations for an FR 2 and an unpaired spectrum

| PRACH Config. Index | Preamble format | $n_{SFN} \bmod x = y$ | | Subframe number | Starting symbol | Number of PRACH slots within a 60-kHz slot | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 74 | A3 | 1 | 0 | 9, 19, 29, 39 | 7 | 2 | 1 | 6 |

Because $\Delta f_{RA}$=120 kHz and the number of PRACH slots within 60-kHz slot is equal to 2, a slot sequence number of a PRACH slot within a reference slot is $$n_{slot}^{RA} \in \{0, 1\}.$$

obtained by extending the parameters predefined by the protocol.

The second configuration signaling may be RRC signaling.

In embodiments of this application, a subcarrier spacing of a reference time unit determined according to a first rule is obtained, and then RO time-domain resource configuration information that is in each subframe and that is used for transmitting a random access preamble is determined based on a first information set and the subcarrier spacing of the reference time unit. In this way, existing RO time-domain resource configuration may be followed, so that a larger PRACH subcarrier spacing is supported.

In some embodiments, the first rule includes:

the subcarrier spacing of the reference time unit is determined by a network-side device or the terminal based on a subcarrier spacing of a physical random access channel PRACH time unit configured by the network-side device.

In some embodiments, the subcarrier spacing of the reference time unit is 1/A of the subcarrier spacing of the PRACH time unit, A is equal to 1 or is an even number greater than 1, and A is predefined by a protocol or configured by signaling.

In some embodiments, A is only applied or configured in a frequency range and/or subcarrier spacing. The frequency range may be 52.6 GHz to 71 GHz.

In some embodiments, in a case that the subcarrier spacing of the reference time unit is determined by the network-side device, the obtaining a subcarrier spacing of a reference time unit includes:

receiving first configuration signaling of the network-side device, where the first configuration signaling implicitly indicates or explicitly indicates the subcarrier spacing of the reference time unit determined by the network-side device. The first configuration signaling may be RRC signaling.

In some embodiments, the first information set includes at least one of the following:

a time unit number of an RO based on a reference time unit;

a time unit number of a PRACH within a reference time unit;

a sequence number of a PRACH time unit within a reference time unit; and

RO configuration information of a preset frequency range.

The preset frequency range may be a frequency range 2 or may be another frequency range, for example, a frequency range 1 or the like.

In some embodiments, the RO configuration information of the preset frequency range includes at least one of the following:

a number of ROs included within a PRACH time unit;

a starting symbol number of a first RO in time domain within each basic time unit including ROs; and a number of OFDM symbols occupied by an RO in time domain.

In some embodiments, the RO configuration information of the preset frequency range is predefined by a protocol or configured by signaling.

In some embodiments, the time unit number of an RO based on a reference time unit is determined based on at least one of a time unit number of an RO based on a basic time unit, a number s of basic time units included within a frame, a subcarrier spacing $\mu_1$ of a reference time unit, and a subcarrier spacing $\mu_2$ of a basic time unit, a value of s is predefined by a protocol or configured by signaling, and a value of $\mu_2$ is predefined by a protocol or configured by signaling. For example, the value of s is predefined by a protocol, and the value of $\mu_2$ is predefined by a protocol; or, the value of s is configured by signaling, and the value of $\mu_2$ is predefined by a protocol; or, the value of s is predefined by a protocol, and the value of $\mu_2$ is configured by signaling; or, the value of s is configured by signaling, and the value of $\mu_2$ is configured by signaling.

In some embodiments, the time unit number of an RO based on a reference time unit is obtained by performing periodic extension on a time unit number of an RO based on a basic time unit, a period is s, and a number of times of the periodic extension is $$\frac{\mu_1}{\mu_2}.$$

In an example, a sequence number of a slot in which an RO based on a basic slot is located is $\{0, 1, \ldots, k\}$ (sequence numbers are not necessarily consecutive, are not necessarily sequential, and do not necessarily start from 0). The number of basic slots included within a frame is s. A subcarrier spacing of a reference slot is $\mu_1$. A subcarrier spacing of a basic slot is $\mu_2$. A rule of the sequence number of a slot in which an RO based on a basic slot is located may be followed to number a slot in which an RO based on a reference slot is located in an extended manner, to obtain that a sequence number of the slot in which an RO based on a reference slot is located is $$\{0, 1, \ldots, k\} + s \times \left\{0, 1, \ldots, \frac{\mu_1}{\mu_2} - 1\right\}.$$

In some embodiments, in a case that N=1, only one PRACH time unit exists within a reference time unit, and a sequence number of a PRACH time unit within a reference time unit may be $$n_{slot}^{RA} = 0.$$

In a case that N>1, a sequence number $$n_{slot}^{RA}$$

of a PRACH time unit within a reference time unit is determined based on at least one of a sequence number of a PRACH time unit within a basic time unit, a maximum number M of PRACH time units included within a basic time unit, and N, and a value of M is predefined by a protocol or configured by signaling.

In some embodiments, in a case that N>1, the sequence number of a time unit of a PRACH within a reference time unit is obtained by performing periodic extension on the sequence number of a time unit of a PRACH within a basic time unit, a period is M, and a number of times of the periodic extension is $$\frac{N}{M}.$$

In an example, in a case that N>1, a sequence number of a slot of a PRACH within a basic slot is $\{0, 1, \ldots, Q\}$ (sequence numbers are not necessarily consecutive, are not necessarily sequential, and do not necessarily start from 0). The maximum number of PRACH slots that may be included within a basic slot is M (M is 2 in an existing protocol). A rule of the sequence number of a slot of a PRACH within a basic slot may be followed to number PRACH slots within a reference slot in an extended manner, to obtain a sequence number $$ n_{slot}^{RA} = \{0, 1, \ldots, Q\} + M \times \left\{0, 1, \ldots, \frac{N}{M} - 1\right\} $$

of a slot of a PRACH within a reference slot.

In some embodiments, the time unit is a slot. For example, one time unit is one slot or a plurality of slots. The time unit may be an RO configuration period. For example, one time unit is one RO configuration period or a plurality of RO configuration periods.

In an embodiment, for example, the time unit is a slot. It is assumed that the design of the FR 2 is followed. As shown in Table 5, in a case that the indicated PRACH Configuration Index is equal to 74, in this configuration, UE can transmit a preamble in a format A3 in only system frames that satisfy $n_{SFN}\%1=0$ (that is, all system frames).

In addition, a PRACH subcarrier spacing supported by the FR 2 is {60 kHz, 120 kHz}. It is assumed that a PRACH subcarrier spacing used in the FR 2 is 120 kHz.

TABLE 5

| | | Random access configurations for an FR 2 and an unpaired spectrum | | | | | | |
|---|---|---|---|---|---|---|---|---|
| PRACH Config. Index | Preamble format | $n_{SFN}$ mod x = y | | Subframe number | Starting symbol | Number of PRACH slots within a 60-kHz slot | $N_t^{RA,slot}$, number of time-domain PRACH occasions within a PRACH slot | $N_{dur}^{RA}$, PRACH duration |
| | | x | y | | | | | |
| 74 | A3 | 1 | 0 | 9, 19, 29, 39 | 7 | 2 | 1 | 6 |

In a case that candidate PRACH subcarrier spacings may be respectively 120 kHz, 480 kHz, and 960 kHz, N=2, and a subcarrier spacing of a reference slot is ½ of a subcarrier spacing of a PRACH slot, corresponding subcarrier spacings $\mu_1$ of a reference slot are respectively 60 kHz, 240 kHz, and 480 kHz.

In this embodiment, the first information set includes:
1. A sequence number of a slot in which an RO based on a reference slot is located:

The sequence number {9, 19, 29, 39} of a slot in which an RO based on a basic slot is located in the FR 2 is followed. Slots that are based on a reference slot and that can be used for transmitting the preamble are numbered in an extended manner to obtain the sequence number of the slot in which an RO based on a reference slot is located:

$$ \{9, 19, 29, 39\} + 40 \times \left\{0, 1, \ldots, \frac{\mu_1}{\mu_2} - 1\right\}. $$

In a case that a PRACH subcarrier spacing is 120 kHz, a corresponding subcarrier spacing $\mu_1$ of a reference slot is 60 kHz, and sequence numbers of slots that can be used for transmitting a preamble are {9, 19, 29, 39}.

In a case that a PRACH subcarrier spacing is 480 kHz, a corresponding subcarrier spacing $\mu_1$ of a reference slot is 240 kHz, and sequence numbers of slots that can be used for transmitting a preamble are {9, 19, 29, 39, 49, 59, 69, 79, . . . , 129, 139, 149, 159}, that is, $$ \{9, 19, 29, 39\} + 40 \times \left\{0, 1, \ldots, \frac{240}{60} - 1\right\} = $$
$$ \{9, 19, 29, 39\} + 40 \times \{0, 1, 2, 3\}. $$

In a case that a PRACH subcarrier spacing is 960 kHz, a corresponding subcarrier spacing $\mu_1$ of a reference slot is 480 kHz, and sequence numbers of slots that can be used for transmitting a preamble are {9, 19, 29, 39, 49, 59, 69, 79, . . . , 289, 299, 309, 319}, that is, $$ \{9, 19, 29, 39\} + 40 \times \left\{0, 1, \ldots, \frac{480}{60} - 1\right\} = $$
$$ \{9, 19, 29, 39\} + 40 \times \{0, 1, 2, 3, 4, 5, 6, 7\}. $$

2. A slot number N of PRACH slots included within a reference slot is equal to 4.

3. A sequence number of a slot of a PRACH within a reference slot. N>1. In the first information set, a sequence number of a slot of a PRACH within a basic slot is {0,1}. The maximum number of PRACH slots that may be included within a basic slot is 2. A rule of the sequence number of a slot of a PRACH within a basic slot of the FR 2 may be followed to number PRACH slots within a reference slot in an extended manner, to obtain a sequence number of a slot of a PRACH within a reference slot:

$$ n_{slot}^{RA} = \{0, 1\} + 2 \times \left\{0, 1, \ldots, \frac{2}{2} - 1\right\} = \{0, 1\}. $$

4. The number of ROs included within a PRACH slot in the first information set is in a one-to-one correspondence with the number of ROs included within a PRACH slot defined in the FR 2, and has a value of 1.

5. A starting symbol number of a first RO in time domain within each basic slot including ROs in the first information set is in a one-to-one correspondence with a starting symbol number of a first RO in time domain within each basic slot including ROs defined in the FR 2, and has a value of 7.

6. An OFDM symbol occupied by an RO in time domain in the first information set is in a one-to-one correspondence with an OFDM symbol occupied by an RO in time domain defined in the FR 2, and has a value of 6.

A formula of calculating a position of a starting OFDM symbol of each RO included within a PRACH slot within a reference slot is $$1 = l_0 + n_t^{RA} N_{dur}^{RA} + 14 n_{slot}^{RA} = 7 + 0 \times 6 + 14 \times \{0, 1\} = \{7, 21\}.$$

Figure 4:
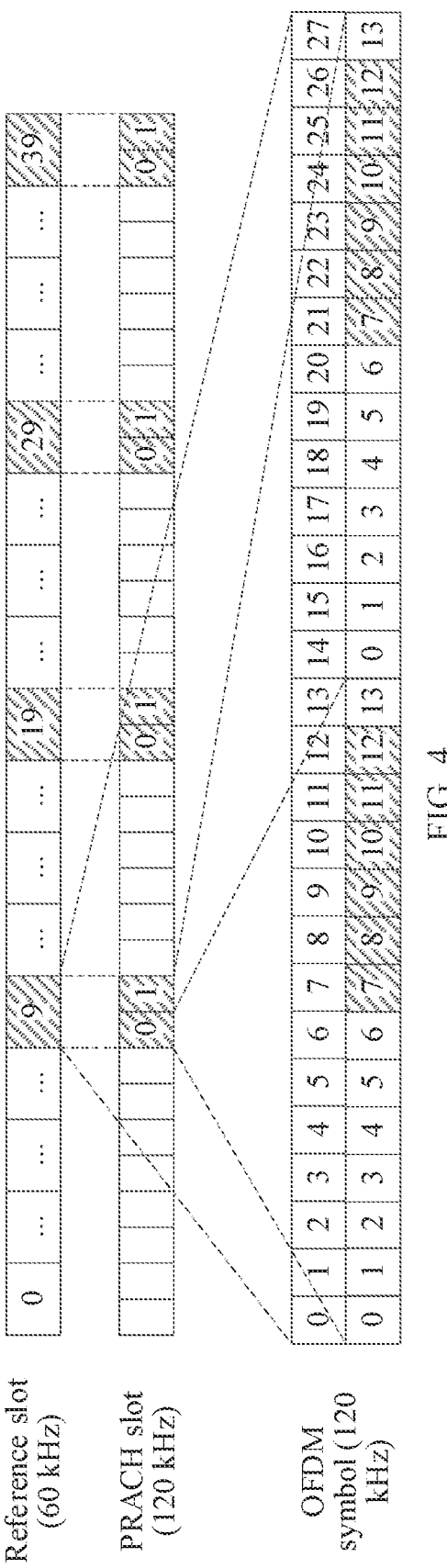
FIG. 4 is a schematic diagram of RO time-domain resource configuration with a PRACH SCS of 120 kHz and N=2 according to an embodiment of this application.
Figure 5:
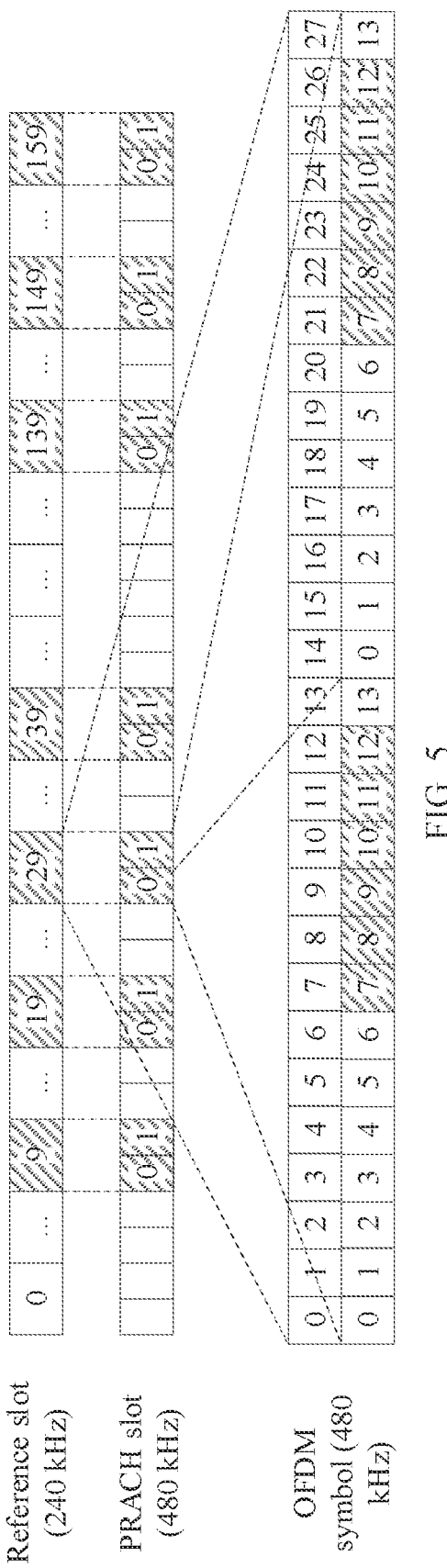
FIG. 5 is a schematic diagram of RO time-domain resource configuration with a PRACH SCS of 480 kHz and N=2 according to an embodiment of this application.
Figure 6:
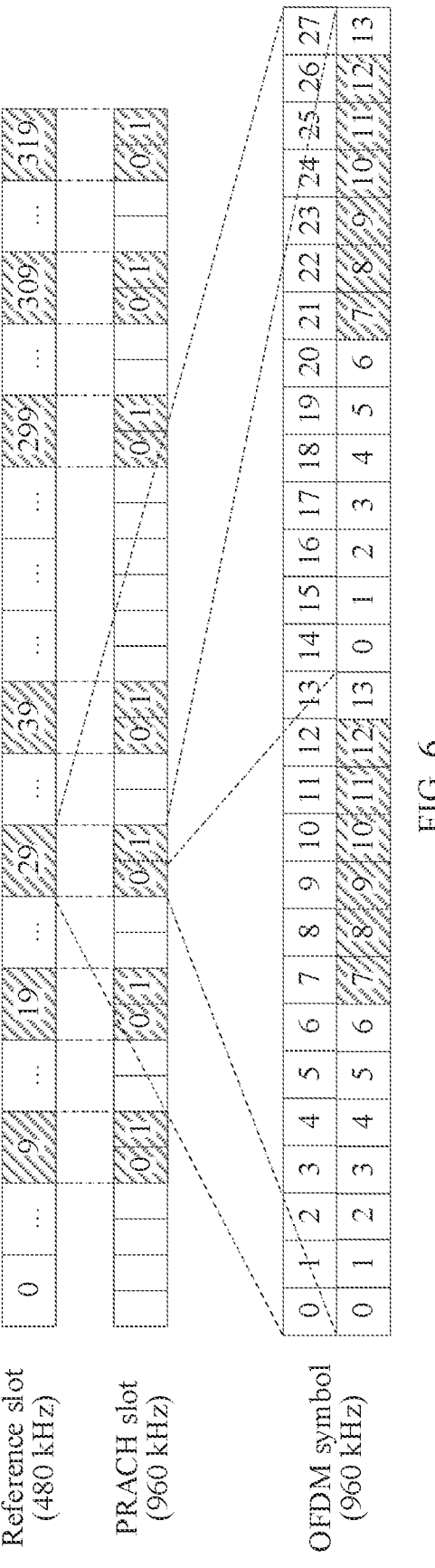
FIG. 6 is a schematic diagram of RO time-domain resource configuration with a PRACH SCS of 960 kHz and N=2 according to an embodiment of this application.

Through the foregoing calculation, RO time-domain resource configuration for transmitting a preamble in each subframe may be obtained based on first information, as shown in FIG. 4 to FIG. 6.

In another embodiment, the design of the FR 2 in the foregoing embodiment is still used. In a case that PRACH subcarrier spacings may be respectively 120 kHz, 480 kHz, and 960 kHz, N=1, and a subcarrier spacing of a reference slot is a subcarrier spacing of a PRACH slot, corresponding subcarrier spacings $\mu_1$ of a reference slot are respectively 120 kHz, 480 kHz, and 960 kHz.

In this embodiment, the first information set includes:
1. A sequence number of a slot in which an RO based on a reference slot is located.

The sequence number {9, 19, 29, 39} of a slot in which an RO based on a basic slot is located in the FR 2 is followed. Slots that are based on a reference slot and that can be used for transmitting the preamble are numbered in an extended manner to obtain the sequence number of the slot in which an RO based on a reference slot is located:

$$\{9, 19, 29, 39\} + 40 \times \left\{0, 1, \dots, \frac{\mu_1}{\mu_2} - 1\right\}.$$

In a case that a PRACH subcarrier spacing is 120 kHz, a corresponding subcarrier spacing $\mu_1$ of a reference slot is 120 kHz, and sequence numbers of slots that can be used for transmitting a preamble are {9, 19, 29, 39, 49, 59, 69, 79}, that is, $$\{9, 19, 29, 39\} + 40 \times \left\{0, 1, \dots, \frac{120}{60} - 1\right\}.$$

In a case that a PRACH subcarrier spacing is 480 kHz, a corresponding subcarrier spacing $\mu_1$ of a reference slot is 480 kHz, and sequence numbers of slots that can be used for transmitting a preamble are {9, 19, 29, 39, 49, 59, 69, 79, . . . , 289, 299, 309, 319}, that is, $$\{9, 19, 29, 39\}, + 40 \times \left\{0, 1, \dots, \frac{480}{60} - 1\right\} =$$
$$\{9, 19, 29, 39\} + 40 \times \{0, 1, 2, 3, 4, 5, 6, 7\}$$

In a case that a PRACH subcarrier spacing is 960 kHz, a corresponding subcarrier spacing $\mu_1$ of a reference slot is 960 kHz, and sequence numbers of slots that can be used for transmitting a preamble are {9, 19, 29, 39, 49, 59, 69, 79, . . . , 609, 619, 629, 639}, that is, $$\{9, 19, 29, 39\} + 40 \times \left\{0, 1, \dots, \frac{960}{60} - 1\right\} =$$

-continued
$$\{9, 19, 29, 39\} + 40 \times \{0, 1, 2, 3, \dots, 13, 14, 15\}.$$

2. A slot number N of PRACH slots included within a reference slot is equal to 1.

3. A sequence number of a slot of a PRACH within a reference slot:

N=1, and a sequence number of a slot of a PRACH within a reference slot is $$n_{slot}^{RA} = 0.$$

4. The number of ROs included within a PRACH slot in the first information set is in a one-to-one correspondence with the number of ROs included within a PRACH slot defined in the FR 2, and has a value of 1.

5. A starting symbol number of a first RO in time domain within each basic slot including ROs in the first information set is in a one-to-one correspondence with a starting symbol number of a first RO in time domain within each basic slot including ROs defined in the FR 2, and has a value of 7.

6. An OFDM symbol occupied by an RO in time domain in the first information set is in a one-to-one correspondence with an OFDM symbol occupied by an RO in time domain defined in the FR 2, and has a value of 6.

A position of a starting OFDM symbol of each RO included within a PRACH slot within a reference slot is:

$$1 = l_0 + n_t^{RA} N_{dur}^{RA} + 14 n_{slot}^{RA} = 7 + 0 \times 6 + 14 \times 0 = \{7\}.$$

Figure 7:
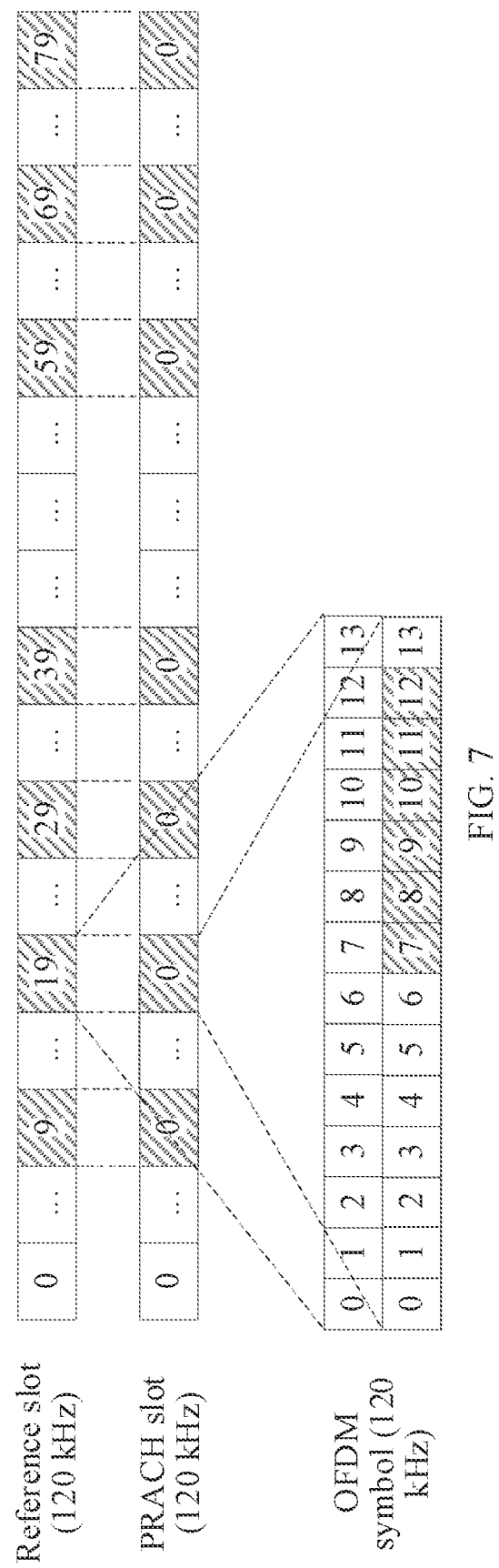
FIG. 7 is a schematic diagram of RO time-domain resource configuration with a PRACH SCS of 120 kHz and N=1 according to an embodiment of this application.
Figure 8:
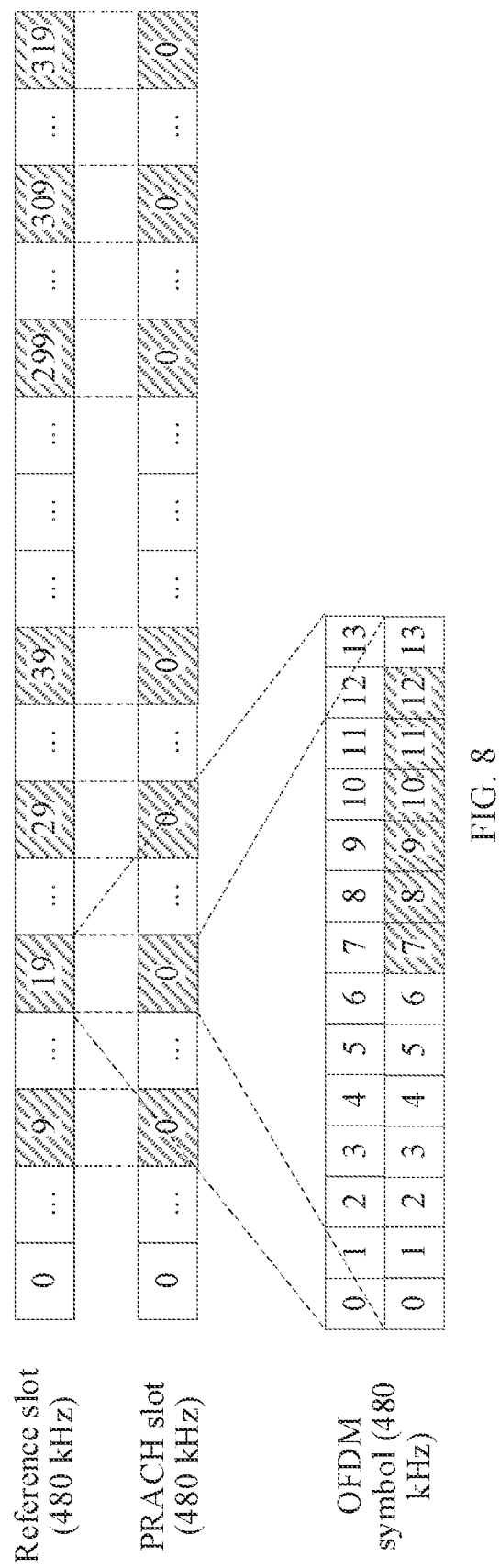
FIG. 8 is a schematic diagram of RO time-domain resource configuration with a PRACH SCS of 480 kHz and N=1 according to an embodiment of this application.
Figures 9, 10:
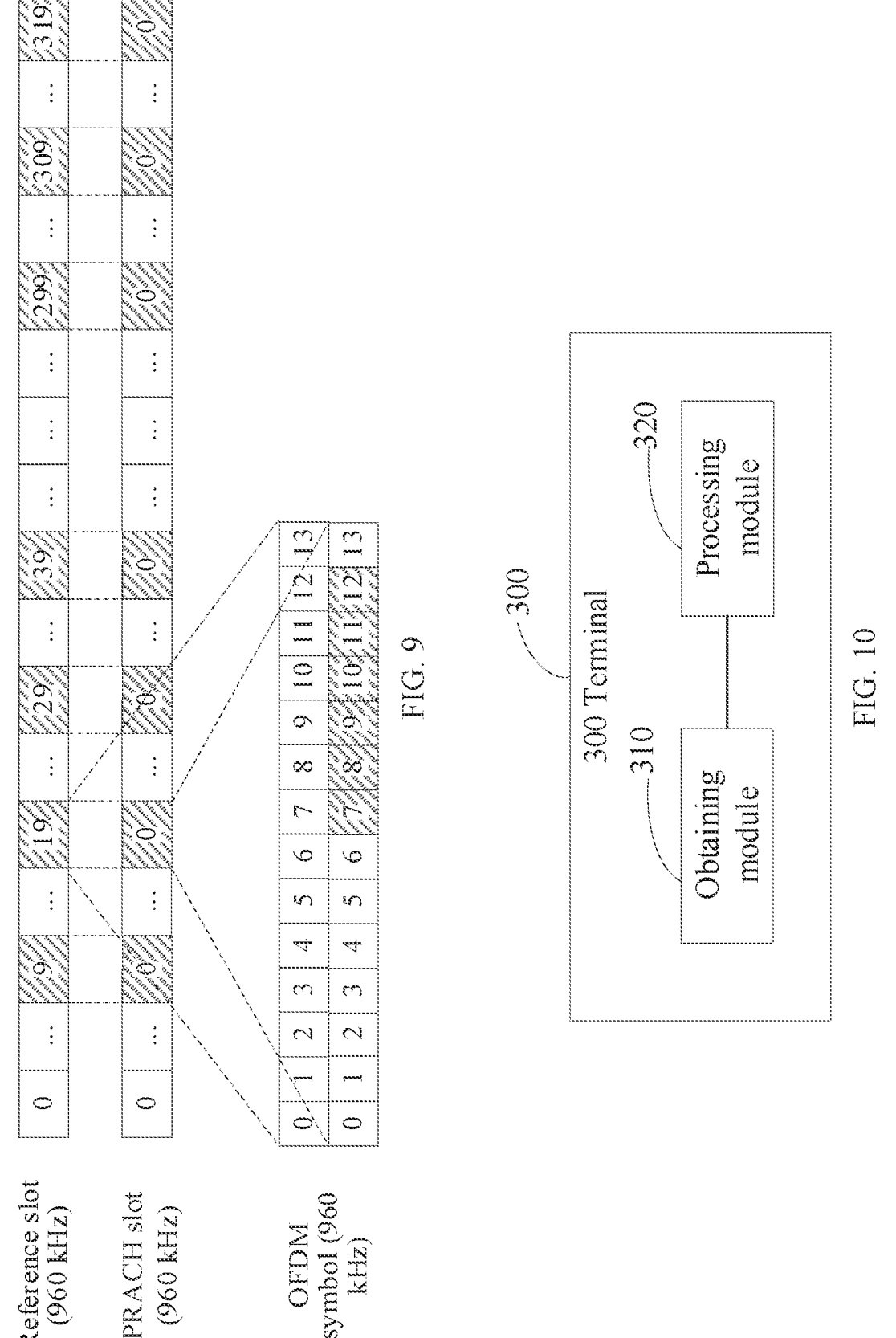
FIG. 9 is a schematic diagram of RO time-domain resource configuration with a PRACH SCS of 960 kHz and N=1 according to an embodiment of this application.
FIG. 10 is a schematic diagram of a structure of an RO time-domain resource configuration apparatus according to an embodiment of this application.

Through the foregoing calculation, RO time-domain resource configuration for transmitting a preamble in each subframe set may be obtained based on the first information set, as shown in FIG. 7 to FIG. 9.

It should be noted that the RO time-domain resource configuration method provided in embodiments of this application may be performed by an RO time-domain resource configuration apparatus or modules in the RO time-domain resource configuration apparatus that are configured to perform and load the RO time-domain resource configuration method. In embodiments of this application, an example in which the RO time-domain resource configuration apparatus performs and loads the RO time-domain resource configuration method is used to describe the RO time-domain resource configuration method provided in embodiments of this application.

An embodiment of this application provides an RO time-domain resource configuration apparatus, applied to a terminal 300. As shown in FIG. 10, the apparatus includes:

an obtaining module 310, configured to obtain a subcarrier spacing of a reference time unit determined according to a first rule; and a processing module 320, configured to determine, based on a first information set and the subcarrier spacing of the reference time unit, RO time-domain resource configuration information that is in each subframe and that is used for transmitting a random access preamble, where parameters of the first information set are obtained in at least one of the following manners:

parameters configured by second configuration signaling;

obtained by extending the parameters configured by the second configuration signaling;

parameters predefined by a protocol; and obtained by extending the parameters predefined by the protocol.

The second configuration signaling may be RRC signaling.

In embodiments of this application, a subcarrier spacing of a reference time unit determined according to a first rule is obtained, and then RO time-domain resource configuration information that is in each subframe and that is used for transmitting a random access preamble is determined based on a first information set and the subcarrier spacing of the reference time unit. In this way, existing RO time-domain resource configuration may be followed, so that a larger PRACH subcarrier spacing is supported.

In some embodiments, the first rule includes:

the subcarrier spacing of the reference time unit is determined by a network-side device or the terminal based on a subcarrier spacing of a physical random access channel PRACH time unit configured by the network-side device.

In some embodiments, the subcarrier spacing of the reference time unit is 1/A of the subcarrier spacing of the PRACH time unit, A is equal to 1 or is an even number greater than 1, and A is predefined by a protocol or configured by signaling.

In some embodiments, A is only applied or configured in a frequency range and/or subcarrier spacing. The frequency range may be 52.6 GHz to 71 GHz. In some embodiments, in a case that the subcarrier spacing of the reference time unit is determined by the network-side device, the obtaining module is configured to receive first configuration signaling of the network-side device, where the first configuration signaling implicitly indicates or explicitly indicates the subcarrier spacing of the reference time unit determined by the network-side device. The first configuration signaling may be RRC signaling.

In some embodiments, the first information set includes at least one of the following:

a time unit number of an RO based on a reference time unit;

a time unit number of a PRACH within a reference time unit;

a sequence number of a PRACH time unit within a reference time unit; and

RO configuration information of a preset frequency range.

In some embodiments, the RO configuration information of the preset frequency range includes at least one of the following:

a number of ROs included within a PRACH time unit;

a starting symbol number of a first RO in time domain within each basic time unit including ROs; and a number of OFDM symbols occupied by an RO in time domain.

In some embodiments, the RO configuration information of the preset frequency range is predefined by a protocol or configured by signaling.

In some embodiments, the time unit number of an RO based on a reference time unit is determined based on at least one of a time unit number of an RO based on a basic time unit, a number s of basic time units included within a frame, a subcarrier spacing $\mu_1$ of a reference time unit, and a subcarrier spacing $\mu_2$ of a basic time unit, a value of s is predefined by a protocol or configured by signaling, and a value of $\mu_2$ is predefined by a protocol or configured by signaling.

In some embodiments, the time unit number of an RO based on a reference time unit is obtained by performing periodic extension on a time unit number of an RO based on a basic time unit, a period is s, and a number of times of the periodic extension is $$\frac{\mu_1}{\mu_2}.$$

In some embodiments, in a case that N=1, a sequence number $$n_{slot}^{RA}$$

of a PRACH time unit within a reference time unit is equal to 0.

In a case that N>1, a sequence number $$n_{slot}^{RA}$$

of a PRACH time unit within a reference time unit is determined based on at least one of a sequence number of a PRACH time unit within a basic time unit, a maximum number M of PRACH time units included within a basic time unit, and N, and a value of M is predefined by a protocol or configured by signaling.

In some embodiments, in a case that N>1, the sequence number of a time unit of a PRACH within a reference time unit is obtained by performing periodic extension on the sequence number of a time unit of a PRACH within a basic time unit, a period is M, and a number of times of the periodic extension is $$\frac{N}{M}.$$

In some embodiments, the time unit is a slot.

The RO time-domain resource configuration apparatus in embodiments of this application may be an apparatus or may be a part, an integrated circuit or a chip in a terminal. The apparatus may be a mobile electronic device or may be a non-mobile electronic device. For example, the mobile electronic device may be a mobile phone, a tablet computer, a notebook computer, a palmtop computer, an in-vehicle electronic device, a wearable device, an Ultra-Mobile Personal Computer (UMPC), a netbook, a Personal Digital Assistant (PDA), or the like. The non-mobile electronic device may be a Network Attached Storage (NAS), a Personal Computer (PC), a Television (TV), a teller machine, a kiosk, or the like. This is not specifically limited to embodiments of this application.

The RO time-domain resource configuration apparatus in embodiments of this application may be an apparatus with an operating system. The operating system may be an Android operating system, may be an iOS operating system, or may be another possible operating system. This is not specifically limited to the embodiments of this application.

For example, an embodiment of this application further provides an electronic device, including a processor, a memory, and a program or instructions stored in the memory and runnable on the processor. The program or instructions, when being executed by the processor, implement each process in the embodiments of the foregoing RO time-domain resource configuration method, and the same technical effect can be achieved. To avoid repetition, details are described again.

It should be noted that the electronic device in embodiments of this application includes the foregoing mobile electronic device or non-mobile electronic device.

Figure 11:
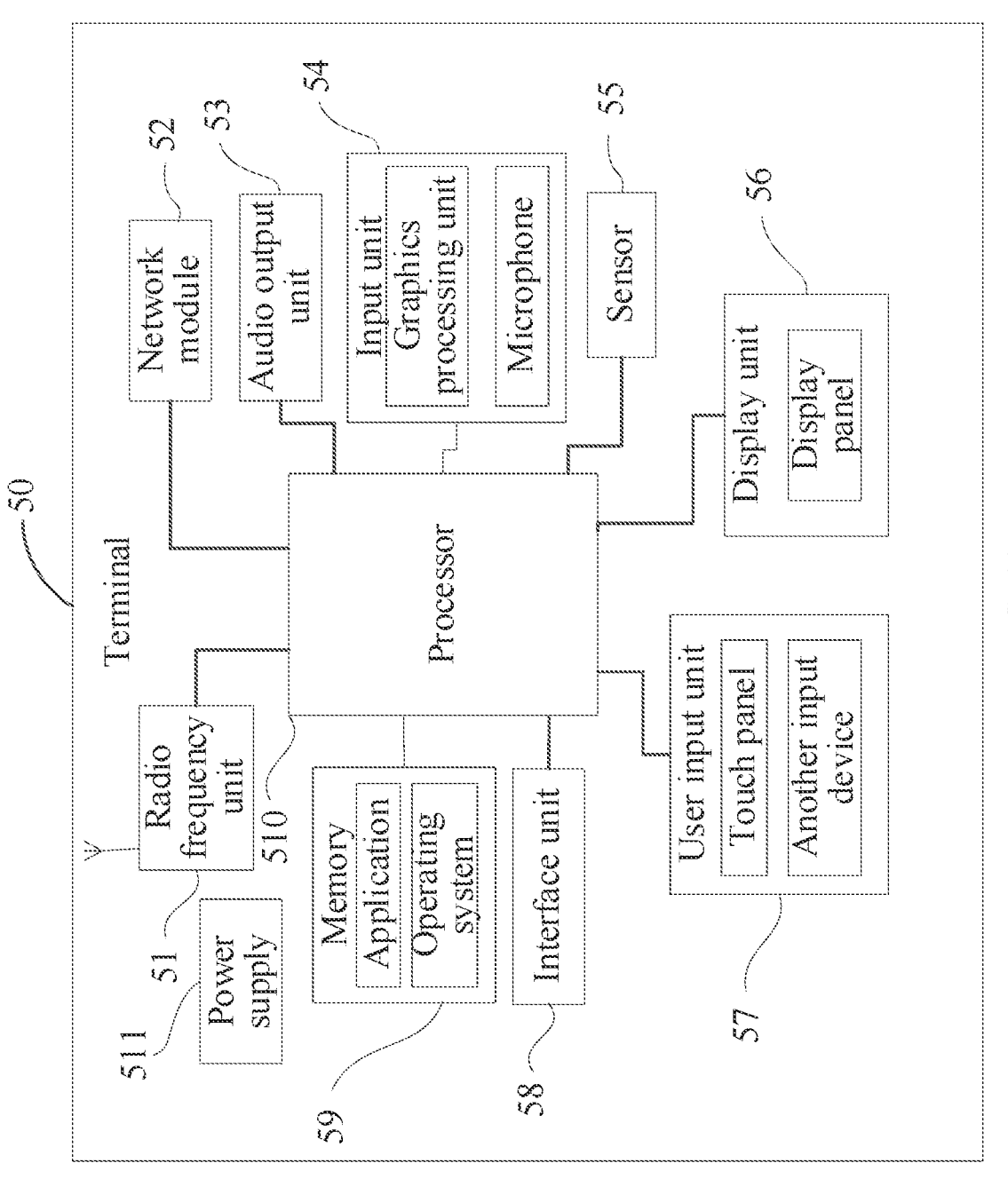
FIG. 11 is a schematic diagram of a composition of a terminal according to an embodiment of this application.

The electronic device in this embodiment may be a terminal. FIG. 11 is a schematic diagram of a hardware structure of a terminal according to various embodiment of the present application. The terminal 50 includes, but is not limited to, components such as a radio frequency unit 51, a network module 52, an audio output unit 53, an input unit 54, a sensor 55, a display unit 56, a user input unit 57, an interface unit 58, a memory 59, a processor 510, and a power supply 511. A person skilled in the art may understand that the terminal structure shown in FIG. 11 does not constitute a limitation on the terminal, and the terminal may include more or fewer components than shown, or combine some components, or have different component arrangements. In the embodiments of this application, the terminal includes, but is not limited to, a mobile phone, a tablet computer, a notebook computer, a handheld computer, an in-vehicle terminal, a wearable device, a pedometer, and the like.

It should be understood that, in this embodiment of this application, the radio frequency unit 51 may be configured to send and receive a signal during an information receiving and sending process or a call process. For example, the radio frequency unit receives downlink data from a base station, then delivers the downlink information to the processor 510 for processing, and sends related uplink data to the base station. Generally, the radio frequency unit 51 includes, but is not limited to, an antenna, at least one amplifier, a transceiver, a coupler, a low noise amplifier, a duplexer, and the like. In addition, the radio frequency unit 51 may further communicate with the network and another device through wireless communication system.

The memory 59 may be configured to store a software program and various data. The memory 59 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 59 may include a high-speed random access memory, and may also include a nonvolatile memory, for example, at least one magnetic disk storage device, a flash memory, or another volatile solid-state storage device.

The processor 510 is a control center of the terminal, and connects to various parts of the terminal by using various interfaces and lines. By running or executing the software program and/or module stored in the memory 59, and invoking data stored in the memory 59, the processor performs various functions and data processing of the terminal, thereby performing overall monitoring on the terminal. The processor 510 may include one or at least two processing units. In some embodiments, the processor 510 may integrate an application processor and a modem processor. The application processor mainly processes an operating system, a user interface, an application program, and the like. The modem processor mainly processes wireless communication. It may be understood that, in some alternative embodiments, the modem processor may not be integrated in the processor 510.

The terminal 50 may further include the power supply 511 (such as a battery) for supplying power to the components. In some embodiments, the power supply 511 may be logically connected to the processor 510 by a power management system, thereby implementing functions such as charging, discharging, and power consumption management by using the power management system.

In addition, the terminal 50 includes some functional module that are not shown, which are not described herein in detail.

In some embodiments, the processor 510 is configured to: obtain a subcarrier spacing of a reference time unit determined according to a first rule is and the processor 510; and determine, based on a first information set and the subcarrier spacing of the reference time unit, RO time-domain resource configuration information that is in each subframe and that is used for transmitting a random access preamble.

parameters of the first information set are obtained in at least one of the following manners:

parameters configured by second configuration signaling;

obtained by extending the parameters configured by the second configuration signaling;

parameters predefined by a protocol; and obtained by extending the parameters predefined by the protocol.

In some embodiments, the first rule includes:

the subcarrier spacing of the reference time unit is determined by a network-side device or the terminal based on a subcarrier spacing of a physical random access channel PRACH time unit configured by the network-side device.

In some embodiments, the subcarrier spacing of the reference time unit is 1/A of the subcarrier spacing of the PRACH time unit, A is equal to 1 or is an even number greater than 1, and A is predefined by a protocol or configured by signaling.

In some embodiments, A is only applied or configured in a frequency range and/or subcarrier spacing.

In some embodiments, in a case that the subcarrier spacing of the reference time unit is determined by the network-side device, the obtaining a subcarrier spacing of a reference time unit includes:

receiving first configuration signaling of the network-side device, where the first configuration signaling implicitly indicates or explicitly indicates the subcarrier spacing of the reference time unit determined by the network-side device.

In some embodiments, the first information set includes at least one of the following:

a time unit number of an RO based on a reference time unit;

a time unit number of a PRACH within a reference time unit;

a sequence number of a PRACH time unit within a reference time unit; and

RO configuration information of a preset frequency range.

The preset frequency range may be a frequency range 2 or may be another frequency range, for example, a frequency range 1 or the like.

In some embodiments, the RO configuration information of the preset frequency range includes at least one of the following:

a number of ROs included within a PRACH time unit;

a starting symbol number of a first RO in time domain within each basic time unit including ROs; and a number of OFDM symbols occupied by an RO in time domain.

In some embodiments, the RO configuration information of the preset frequency range is predefined by a protocol or configured by signaling.

In some embodiments, the time unit number of an RO based on a reference time unit is determined based on at least one of a time unit number of an RO based on a basic time unit, a number s of basic time units included within a frame, a subcarrier spacing $\mu_1$ of a reference time unit, and a subcarrier spacing $\mu_2$ of a basic time unit, a value of s is predefined by a protocol or configured by signaling, and a value of $\mu_2$ is predefined by a protocol or configured by signaling. For example, the value of s is predefined by a protocol, and the value of $\mu_2$ is predefined by a protocol; or, the value of s is configured by signaling, and the value of $\mu_2$ is predefined by a protocol; or, the value of s is predefined by a protocol, and the value of $\mu_2$ is configured by signaling; or, the value of s is configured by signaling, and the value of $\mu_2$ is configured by signaling.

In some embodiments, the time unit number of an RO based on a reference time unit is obtained by performing periodic extension on a time unit number of an RO based on a basic time unit, a period is s, and a number of times of the periodic extension is $$\frac{\mu_1}{\mu_2}.$$

In some embodiments, in a indicating that data transmission case that N=1, only one PRACH time unit exists within a reference time unit, and a sequence number of a PRACH time unit within a reference time unit may be $$n_{slot}^{RA} = 0.$$

In a case that N>1, a sequence number $$n_{slot}^{RA}$$

of a PRACH time unit within a reference time unit is determined based on at least one of a sequence number of a PRACH time unit within a basic time unit, a maximum number M of PRACH time units included within a basic time unit, and N, and a value of M is predefined by a protocol or configured by signaling.

In some embodiments, in a case that N>1, the sequence number of a time unit of a PRACH within a reference time unit is obtained by performing periodic extension on the sequence number of a time unit of a PRACH within a basic time unit, a period is M, and a number of times of the periodic extension is $$\frac{N}{M}.$$

In some embodiments, the time unit is a slot. For example, one time unit is one slot or a plurality of slots. The time unit may be an RO configuration period. For example, one time unit is one RO configuration period or a plurality of RO configuration periods.

The embodiments of the present application further provide a readable storage medium. The readable storage medium stores a program or an instruction. The program or instruction, when being executed by a processor, implements each process of the foregoing embodiments of the RO time-domain resource configuration method, and the same technical effect can be achieved. To avoid repetition, details are not described herein again.

The processor is a processor in the electronic device in the foregoing embodiments. The readable storage medium includes a computer-readable storage medium, for example, a computer Read-Only Memory (ROM), a Random Access Memory (RAM), a magnetic disk, an optical disc, or the like.

An embodiment of this application further provides a chip. The chip includes a processor and a communication interface. The communication interface is coupled to the processor are. The processor is configured to execute a program or an instruction to implement various processes in the embodiments of the RO time-domain resource configuration method, and can achieve the same technical effect. To avoid repetition, details are described again.

An embodiment of this application further provides a computer program product. The computer program product is stored in a non-volatile storage medium. The computer program product is executed by at least one processor to implement various processes in embodiments of the foregoing RO time-domain resource configuration method, and can achieve the same technical effect. To avoid repetition, details are described again.

It should be noted that, the chip mentioned in the embodiments of this application may also be referred to as a system-level chip, a system chip, a chip system, a system on chip, or the like.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one . . . " does not exclude that there are still other same elements in the processes, methods, objects, or apparatuses. Further, it needs to be noted that the scope of the methods and apparatuses in the embodiments of this application is not limited to performing the functions in the order shown or discussed, but may also include performing the functions in a substantially simultaneous manner or in the reverse order depending on the functions involved. For example, the described methods may be performed in a different order than described, and various steps may also be added, omitted, or combined. In addition, features described with reference to some examples may be combined in other examples.

Through the descriptions of the foregoing implementations, a person skilled in the art may clearly understand that the methods in the foregoing embodiments may be implemented through software and a necessary general hardware platform, and may be implemented by hardware. In some embodiments, the technical solutions of the present application or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, a network device, or the like) to perform the foregoing methods described in the embodiments of the present application.

The embodiments of the present application are described above with reference to the accompanying drawings. However, the application is not limited to the foregoing implementations. The foregoing implementations are illustrative instead of limitative. Enlightened by the present application, a person of ordinary skill in the application make many forms without departing from the idea of the present application and the scope of protection of the claims. All of the forms fall within the protection of the present application.

What is claimed is:

1. A Random access Occasion (RO) time-domain resource configuration method, performed by a terminal, comprising:

obtaining a subcarrier spacing of a reference time unit determined according to a first rule; and determining, based on a first information set and the subcarrier spacing of the reference time unit, RO time-domain resource configuration information that is in each subframe and that is used for transmitting a random access preamble, wherein parameters of the first information set are obtained in at least one of the following manners:

parameters configured by second configuration signaling;

obtained by extending the parameters configured by the second configuration signaling;

or obtained by extending the parameters predefined by the protocol.

2. The RO time-domain resource configuration method according to claim 1, wherein the first rule comprises:

the subcarrier spacing of the reference time unit is determined by a network-side device or the terminal based on a subcarrier spacing of a Physical Random Access Channel (PRACH) time unit configured by the network-side device.

3. The RO time-domain resource configuration method according to claim 2, wherein the subcarrier spacing of the reference time unit is $$\frac{1}{A}$$

of the subcarrier spacing of the PRACH time unit, wherein A is equal to 1 or is an even number greater than 1, and A is predefined by a protocol or configured by signaling.

4. The RO time-domain resource configuration method according to claim 3, wherein A is only applied or configured in a frequency range or subcarrier spacing.

5. The RO time-domain resource configuration method according to claim 2, wherein when the subcarrier spacing of the reference time unit is determined by the network-side device, the obtaining a subcarrier spacing of a reference time unit comprises:

receiving first configuration signaling of the network-side device, wherein the first configuration signaling implicitly indicates or explicitly indicates the subcarrier spacing of the reference time unit determined by the network-side device.

6. The RO time-domain resource configuration method according to claim 1, wherein the first information set comprises at least one of the following:

a time unit number of an RO based on a reference time unit;

unit;

24 a time unit number of a PRACH within a reference time unit;

a sequence number of a PRACH time unit within a reference time unit; or

RO configuration information of a preset frequency range.

7. The RO time-domain resource configuration method according to claim 6, wherein the RO configuration information of the preset frequency range comprises at least one of the following:

a number of Ros within a PRACH time unit;

a starting symbol of a first RO in time domain within each basic time unit comprising ROs; or a number of Orthogonal Frequency Division Multiple (OFDM) symbols occupied by an RO in time domain.

8. The RO time-domain resource configuration method according to claim 6, wherein the RO configuration information of the preset frequency range is predefined by a protocol or configured by signaling.

9. The RO time-domain resource configuration method according to claim 6, wherein the time unit number of an RO based on a reference time unit is determined based on at least one of the following:

a time unit number of an RO based on a basic time unit, a number s of basic time units comprised within a frame, a subcarrier spacing $\mu_1$ of a reference time unit, or a subcarrier spacing $\mu_2$ of a basic time unit, wherein a value of s is predefined by a protocol or configured by signaling, and a value of $\mu_2$ is predefined by a protocol or configured by signaling.

10. The RO time-domain resource configuration method according to claim 9, wherein the time unit number of an RO based on a reference time unit is obtained by performing periodic extension on a time unit number of an RO based on a basic time unit, wherein a period is s, and a number of times of the periodic extension is $$\frac{\mu_1}{\mu_2}.$$

11. The RO time-domain resource configuration method according to claim 6, wherein in a case that N=1, a sequence number $$n_{slot}^{RA}$$

of a PRACH time unit within a reference time unit is equal to 0; or in a case that N>1, a sequence number $$n_{slot}^{RA}$$

of a PRACH time unit within a reference time unit is determined based on at least one of the following:

a sequence number of a PRACH time unit within a basic time unit, a maximum number M of PRACH time units comprised within a basic time unit, and N, wherein a value of M is predefined by a protocol or configured by signaling.

12. The RO time-domain resource configuration method according to claim 11, wherein in a case that N>1, the sequence number of a PRACH time unit within a reference time unit is obtained by performing periodic extension on the sequence number of a PRACH time unit within a basic time unit, wherein a period is M, and a number of times of the periodic extension is $$\frac{N}{M}.$$

13. The RO time-domain resource configuration method according to claim 1, wherein the time unit is a slot.

14. An electronic device, comprising a processor; a memory having a computer program or an instruction stored thereon, wherein the computer program or the instruction, when executed by the processor, causes the processor to implement a Random access Occasion (RO) time-domain resource configuration method, comprising:

obtaining a subcarrier spacing of a reference time unit determined according to a first rule; and determining, based on a first information set and the subcarrier spacing of the reference time unit, RO time-domain resource configuration information that is in each subframe and that is used for transmitting a random access preamble, wherein parameters of the first information set are obtained in at least one of the following manners:

parameters configured by second configuration signaling;

obtained by extending the parameters configured by the second configuration signaling;

or obtained by extending the parameters predefined by the protocol.

15. The RO time-domain resource configuration method according to claim 14, wherein the first rule comprises:

the subcarrier spacing of the reference time unit is determined by a network-side device or the terminal based on a subcarrier spacing of a Physical Random Access Channel (PRACH) time unit configured by the network-side device.

16. The RO time-domain resource configuration method according to claim 15, wherein the subcarrier spacing of the reference time unit is $$\frac{1}{A}$$

of the subcarrier spacing of the PRACH time unit, wherein A is equal to 1 or is an even number greater than 1, and A is predefined by a protocol or configured by signaling.

17. The RO time-domain resource configuration method according to claim 16, wherein A is only applied or configured in a frequency range or subcarrier spacing.

18. The RO time-domain resource configuration method according to claim 15, wherein when the subcarrier spacing of the reference time unit is determined by the network-side device, the obtaining a subcarrier spacing of a reference time unit comprises:

receiving first configuration signaling of the network-side device, wherein the first configuration signaling implicitly indicates or explicitly indicates the subcarrier spacing of the reference time unit determined by the network-side device.

19. The RO time-domain resource configuration method according to claim 14, wherein the first information set comprises at least one of the following:

a time unit number of an RO based on a reference time unit;

a time unit number of a PRACH within a reference time unit;

a sequence number of a PRACH time unit within a reference time unit; or

RO configuration information of a preset frequency range.

20. A non-transitory computer readable storage medium storing a computer program or an instruction that, when executed by a processor, causes the processor to implement a Random access Occasion (RO) time-domain resource configuration method, comprising:

obtaining a subcarrier spacing of a reference time unit determined according to a first rule; and determining, based on a first information set and the subcarrier spacing of the reference time unit, RO time-domain resource configuration information that is in each subframe and that is used for transmitting a random access preamble, wherein parameters of the first information set are obtained in at least one of the following manners:

parameters configured by second configuration signaling;

obtained by extending the parameters configured by the second configuration signaling;

or obtained by extending the parameters predefined by the protocol.

* * * * *